US012148359B2

(12) United States Patent
Li et al.

(10) Patent No.: US 12,148,359 B2
(45) Date of Patent: Nov. 19, 2024

(54) DISPLAY PANEL, DRIVING CIRCUIT AND DRIVING METHOD WITH UNIFORM BRIGHTNESS

(71) Applicant: HKC CORPORATION LIMITED, Shenzhen (CN)

(72) Inventors: Zeyao Li, Shenzhen (CN); Rongrong Li, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/078,044

(22) Filed: Dec. 8, 2022

(65) Prior Publication Data

US 2023/0386391 A1 Nov. 30, 2023

(30) Foreign Application Priority Data

May 25, 2022 (CN) ........................ 202210580512.4

(51) Int. Cl.
*G09G 3/32* (2016.01)

(52) U.S. Cl.
CPC ....... *G09G 3/32* (2013.01); *G09G 2300/0842* (2013.01); *G09G 2310/0267* (2013.01);
(Continued)

(58) Field of Classification Search
CPC ... G09G 3/32–3291; G09G 2300/0426; G09G 2300/043; G09G 2300/0809; G09G 2300/0819; G09G 2300/0842; G09G 2310/0243; G09G 2310/0248; G09G 2310/0251; G09G 2310/0267;
(Continued)

(56) References Cited

U.S. PATENT DOCUMENTS

2010/0270678 A1* 10/2010 Ikeda .................. G09G 3/3233 257/773
2014/0022289 A1* 1/2014 Lee ........................ G09G 3/006 345/76

(Continued)

FOREIGN PATENT DOCUMENTS

CN 104809986 A 7/2015
CN 106847187 A 6/2017

(Continued)

OTHER PUBLICATIONS

Chinese First Office Action, Chinese Application No. 202210580512.4,mailed Jun. 13, 2023 (15 pages).

(Continued)

*Primary Examiner* — Nathan Danielsen

(57) ABSTRACT

The present disclosure provides a display panel, a driving circuit and a driving method. The driving circuit includes a plurality of sub-pixels arranged in an array, wherein sub-pixels in two adjacent columns are connected to a same detection line for detecting a corresponding driving current of any of the sub-pixels in the two adjacent columns; wherein each driving current is configured to determine a corresponding compensation signal of corresponding two adjacent sub-pixels, for compensating data driving signals of the corresponding two adjacent sub-pixels based on the corresponding compensation signal in a displaying operation.

13 Claims, 10 Drawing Sheets

(52) U.S. Cl.
CPC ............... *G09G 2310/0275* (2013.01); *G09G 2320/0233* (2013.01)

(58) Field of Classification Search
CPC ... G09G 2310/0275; G09G 2310/0294; G09G 2310/06; G09G 2310/08; G09G 2320/0233; G09G 2320/04; G09G 2320/043; G09G 2320/045
See application file for complete search history.

(56) References Cited

U.S. PATENT DOCUMENTS

| | | | | |
|---|---|---|---|---|
| 2016/0133193 | A1 | 5/2016 | Lee et al. | |
| 2017/0169796 | A1 | 6/2017 | Tai et al. | |
| 2018/0151129 | A1* | 5/2018 | Park | G09G 3/3291 |
| 2020/0074927 | A1* | 3/2020 | Xu | G09G 3/3233 |
| 2020/0243005 | A1 | 7/2020 | Li et al. | |
| 2021/0183283 | A1 | 6/2021 | Park et al. | |
| 2021/0366379 | A1* | 11/2021 | Xu | G09G 3/3225 |

FOREIGN PATENT DOCUMENTS

| | | | |
|---|---|---|---|
| CN | 109215569 | A | 1/2019 |
| CN | 109637445 | A | 4/2019 |
| CN | 110956929 | A | 4/2020 |
| CN | 210984239 | U | 7/2020 |
| CN | 112164376 | A | 1/2021 |
| CN | 212516502 | U | 2/2021 |
| CN | 113393785 | A | 9/2021 |

OTHER PUBLICATIONS

Notification to Grant Patent Right for Invention, Chinese Application No. 202210580512.4, mailed Jul. 13, 2023 (6 pages).

* cited by examiner

M1

| I1 (mA) | | column | | | | |
|---|---|---|---|---|---|---|
| | | 1&2 | 3&4 | ...... | N-3&N-2 | N-1&N |
| row | 1 | I (1, 1) | I (3, 1) | ...... | I (N-3, 1) | I (N-1, 1) |
| | 2 | I (1, 1) | I (3, 22) | ...... | I (N-3, 2) | I (N-1, 2) |
| | ...... | ...... | ...... | ...... | ...... | ...... |
| | M-1 | I (1, M-1) | I (3, M-1) | ...... | I (N-3, M-1) | I (N-1, M-1) |
| | M | I (1, M) | I (3, M) | ...... | I (N-3, M) | I (N-1, M) |

M2

| gray scale X | | | | | | |
|---|---|---|---|---|---|---|
| V2 | | column | | | | |
| | | 1&2 | 3&4 | ...... | N-3&N-2 | N-1&N |
| row | 1 | V2x (1, 1) | V2x (3, 1) | ...... | V2x (N-3, 1) | V2x (N-1, 1) |
| | 2 | V2x (1, 1) | V2x (3, 2) | ...... | V2x (N-3, 2) | V2x (N-1, 2) |
| | ...... | ...... | ...... | ...... | ...... | ...... |
| | M-1 | V2x (1, M-1) | V2x (3, M-1) | ...... | V2x(N-3, M-1) | V2x(N-1, M-1) |
| | M | V2x (1, M) | V2x (3, M) | ...... | V2x (N-3, M) | V2x (N-1, M) |

DISPLAY PANEL, DRIVING CIRCUIT AND DRIVING METHOD WITH UNIFORM BRIGHTNESS

CROSS-REFERENCE TO RELATED APPLICATIONS

The present disclosure claims priority of Chinese Patent Application No. 202210580512.4 and application name of "DISPLAY PANEL, DRIVING CIRCUIT AND DRIVING METHOD", filed on May 25, 2022, the contents of which are hereby incorporated by reference.

TECHNICAL FIELD

The present disclosure relates to the field of display technologies, and in particular, to a display panel, a driving circuit and a driving method.

BACKGROUND

Inorganic micro light emitting diode (Micro LED) displays are one of the hot spots in the display research field. A micro LED has the advantages of high reliability, low power consumption, high brightness and fast response speed. A driving circuit configured to control emission of a light-emitting elements is a core technology of micro LED displays and has important research significance.

However, there are different driving currents of driving transistors at different positions and at different times in the driving circuit, resulting in nonuniform brightness of a display panel.

SUMMARY

In order to solve the above problems, the present disclosure provides a display panel, a driving circuit and a driving method to solve the problems of nonuniform brightness and more wiring of the display panel.

In order to solve the above problems, the first technical solution provided by the present disclosure is to provide a driving circuit. The driving circuit includes a plurality of sub-pixels arranged in an array. Sub-pixels in two adjacent columns are connected to a same detection line for detecting a corresponding driving current of any of the sub-pixels in the two adjacent columns. Each driving current is configured to determine a corresponding compensation signal of corresponding two adjacent sub-pixels, for compensating data driving signals of the corresponding two adjacent sub-pixels based on the corresponding compensation signal in a displaying operation.

In order to solve the above problems, the third technical solution provided by the present disclosure is to provide a driving method for a driving circuit of a display panel. The method includes: two adjacent sub-pixels simultaneously performing a detection operation, and respectively obtaining detection driving currents of the two adjacent sub-pixels in one-to-one correspondence in the detection operation; determining a common compensation signal of the two adjacent sub-pixels based on the detection driving currents of the two adjacent sub-pixels; and compensating data driving signals of the two adjacent sub-pixels by the common compensation signal, and driving light-emitting element of each of the two adjacent sub-pixels to emit light, in a display operation.

BRIEF DESCRIPTION OF THE DRAWINGS

In order to more clearly illustrate the technical solutions in the embodiments of the present disclosure, a brief description of the accompanying drawings to be used in the description of the embodiments will be given below. It will be obvious that the accompanying drawings in the following description are only some embodiments of the present disclosure, and that other accompanying drawings may be obtained on the basis of these drawings without any creative effort for those skilled in the art.

Figure 1:
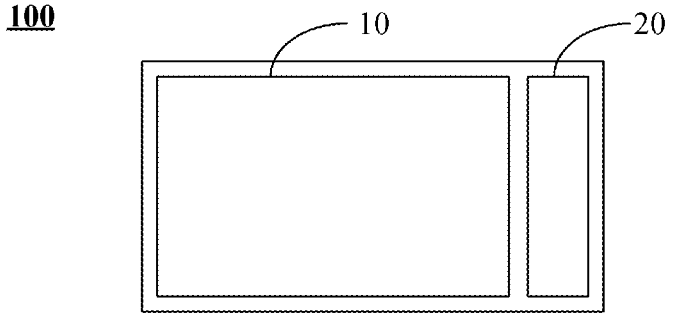
FIG. 1 is a structural schematic view of a display panel according to a first embodiment of the present disclosure.

Reference numerals are illustrated as following: display panel—100, driving circuit—10, driving chip—20, data driving signal—Vdata, detection driving current—I1, compensation signal—V2, common compensation signal—V2', sub—pixel—11, light—emitting element—111, pre—charging unit—112, driving unit—113, detection unit—114, path control unit—115, data line—12, detection line—13, first scanning line—L1, second scanning line—L2, display driving line—L3, third scanning line—L4, first scanning signal—Vscan 1, second scanning signal—Vscan 2, display signal—LC, third scanning signal—Vscan 4, first switch—T1, second switch—T2, third switch—T3, fourth switch—T4, fifth switch—T5, capacitor—C, first node—A, second node—B, detection data table—M1, compensation data table—M2, and gray scale—X.

DETAILED DESCRIPTION OF THE PREFERRED EMBODIMENTS

The technical solutions in the embodiments of the present disclosure will be clearly and completely described below with reference to the drawings in the embodiments of the present disclosure. Apparently, the described embodiments are only a part of the embodiments of the present disclosure, not all of the embodiments. All other embodiments obtained by those skilled in the art based on the embodiments of the present disclosure without creative efforts shall fall within the protection scope of the present disclosure.

The inventors of the present disclosure have found that when a display panel performs a display operation, since a temporal change may exit the characteristics of transistors in driving currents of transistors at different positions and at different times are different, resulting in unstable light emission of a light-emitting element, nonuniform brightness of the display panel, and affecting user experience.

In order to solve the above problems, in some embodiments, the present disclosure is to provide a driving circuit. The driving circuit includes a plurality of sub-pixels arranged in an array. Sub-pixels in two adjacent columns are connected to a same detection line for detecting a corresponding driving current of any of the sub-pixels in the two adjacent columns. Each driving current is configured to determine a corresponding compensation signal of corresponding two adjacent sub-pixels, for compensating data driving signals of the corresponding two adjacent sub-pixels based on the corresponding compensation signal in a displaying operation.

Alternatively, each of the plurality of sub-pixels includes: a light-emitting element, a pre-charging unit, a driving unit and a detection unit. The pre-charging unit is connected to a data line to receive a data driving signal. The driving unit is connected to the pre-charging unit and the light-emitting element. The detection unit is connected to the driving unit and the detection line. Detection units of the sub-pixels in two adjacent columns are connected to the same detection line, and two adjacent sub-pixels are configured to simultaneously perform a detection operation. In the detection operation, a pre-charging unit of any of two adjacent sub-pixels is configured to receive a corresponding data driving signal of any of two adjacent sub-pixels through a corresponding data wire connected thereto, a driving unit of any of the two adjacent sub-pixels is configured to generate a corresponding detection driving current of any of the two adjacent sub-pixels based on the corresponding data driving signal, and a detection unit of any of the two adjacent sub-pixels is configured to detect a detection driving current generated by the corresponding driving unit connected thereto, such that the display panel determines the corresponding compensation signal of the corresponding two adjacent sub-pixels based on corresponding driving currents of the corresponding two adjacent sub-pixels and compensates the data driving signals of the corresponding two adjacent sub-pixels based on the corresponding compensation signal. In the display operation, a pre-charging unit of any of the plurality of sub-pixels is configured to receive the corresponding compensated data driving signal through the data line, and a driving unit of any of the plurality of sub-pixels is configured to generate a corresponding display driving current of any of the plurality of sub-pixels based on the corresponding compensated data driving signal to drive the light-emitting element to emit light.

Alternatively, a distance between driving units of the two adjacent sub-pixels is less than or equal to a width of a sub-pixel.

Alternatively, each of the plurality of sub-pixels further includes: a path control unit connected between the driving unit and the light-emitting element. In the detection operation, a path control unit of any of two adjacent sub-pixels is configured not to conduct a loop where a corresponding driving unit and a corresponding light-emitting element of any of two adjacent sub-pixels are located, and a corresponding detection unit of any of two adjacent sub-pixels is configured to detect the detection driving current generated by the corresponding driving unit connected thereto, and output a sum of the detection driving currents of the corresponding two adjacent sub-pixels through the detection line, such that the display panel determines the corresponding compensation signal of the corresponding two adjacent sub-pixels. In the display operation, a path control unit of any of the plurality of sub-pixels is configured to conduct the loop where a corresponding driving unit and a corresponding light-emitting element of any of the plurality of sub-pixels are located, and the corresponding driving unit is in a high-impedance state, the corresponding driving unit is configured to generate the corresponding display driving current of any of the plurality of sub-pixels based on the corresponding compensated data driving signal, and the corresponding display driving current flows through the corresponding light-emitting element of any of the plurality of sub-pixels through a conductive path control unit of any of the plurality of sub-pixels, to drive the corresponding light-emitting element to emit light.

Alternatively, the pre-charging unit of any of the plurality of sub-pixels is connected to a first scanning line to receive a first scanning signal and is configured to control whether the pre-charging unit of any of the plurality of sub-pixels is conductive based on the first scanning signal. The detection unit of any of the plurality of sub-pixels is connected to a second scanning line to receive a second scanning signal, and is configured to control whether the detection unit of any of the plurality of sub-pixels is conductive based on the second scanning signal. A conductive period of the second scanning signal is later than a conductive period of the first scanning signal.

Alternatively, in the detection operation, in a pre-charging stage, the detection units of the sub-pixels in two adjacent columns are conductive based on the first scanning signal to input the corresponding data driving signal of any of the sub-pixels in two adjacent columns to the corresponding driving unit and store the corresponding data driving signal, and the corresponding driving unit is configured to generate a corresponding detection driving current based on the corresponding data driving signal; in a detection stage, the detection units of the two adjacent sub-pixels are conductive based on the second scanning signal to output a sum of corresponding detection driving currents of the two adjacent sub-pixels to a driving chip of the display panel through the detection line, to determine the corresponding compensation signal of corresponding two adjacent sub-pixels for compensating the data driving signals of the corresponding two adjacent sub-pixels based on the corresponding compensation signal. In the display operation, in the pre-charging stage, the pre-charging unit of any of the plurality of sub-pixels is conductive based on the first scanning signal to input the corresponding compensated data driving signal of any of the sub-pixels in two adjacent columns to the corresponding driving unit and store the corresponding compensated data driving signal, and the corresponding driving unit is configured to generate the corresponding display driving current based on the compensated data driving signal and drive the corresponding light-emitting element to emit light; and the detection unit is configured to determine that the driving chip of the display panel is in a high-impedance state during the detection unit of any of the plurality of sub-pixels is conductive based on the second scanning signal.

Alternatively, the pre-charging unit of any of the plurality of sub-pixels includes a first switch, and the first switch is connected to the data line and the driving unit, and is configured to receive the first scanning signal. The driving unit of any of the plurality of sub-pixels includes a second switch and a capacitor, the second switch is connected to a first voltage source, the detection unit and the pre-charging unit of any of the plurality of sub-pixels; the capacitor is connected to the second switch. The detection unit of any of the plurality of sub-pixels includes a third switch, and the third switch is connected to the corresponding driving unit of any one of the plurality of sub-pixels and the detection line, and is configured to receive the second scanning signal. The path control unit of any of the plurality of sub-pixels includes a fourth switch, and the fourth switch is connected to the corresponding driving unit and the corresponding light-emitting element of any one of the plurality of sub-pixels, the light-emitting element is also connected to a second voltage source, and the fourth switch is configured to receive a display signal.

Alternatively, the path control unit of any of the plurality of sub-pixels is connected to a display driving line to receive a display signal, and is configured to determine whether the path control unit of any of the plurality of sub-pixels is conductive based on the display signal; a conductive period of the display signal is later than the conductive period of the second scanning signal.

Alternatively, an enabling period of the second scanning signal follows an enabling period of the first scanning signal; an enabling period of the display signal is later than the enabling period of the first scanning signal and the enabling period of the second scanning signal.

Alternatively, the detection operation is performed through at least one detection screen in response to a power on operation of the display panel through at least one frame detection screen.

Alternatively, the detection operation is performed through at least one frame detection screen in response to the display operation of the display panel reaching a preset time.

Alternatively, the pre-charging unit includes a first switch. The first switch includes a first terminal, a second terminal, and a control terminal. The first terminal of the first switch is connected to the data line, the second terminal of the first switch is connected to the driving unit, and the control terminal of the first switch is configured to receive the first scanning signal.

Alternatively, the driving unit includes a second switch and a capacitor. The second switch includes a first terminal, a second terminal, and a control terminal. The first terminal of the second switch is connected to a first voltage source, the second terminal of the second switch is connected to the detection unit, and the control terminal of the second switch is connected to the pre-charging unit. The capacitor includes a first terminal and a second terminal. The first terminal of the capacitor is connected to the first terminal of the second switch, and the second terminal of the capacitor is connected to the control terminal of the second switch.

Alternatively, the detection unit includes a third switch. The third switch includes a first terminal, a second terminal, and a control terminal. The first terminal of the third switch is connected to the driving unit, the second terminal of the third switch is connected to the detection line, and the control terminal of the third switch is configured to receive the second scanning signal.

Alternatively, the path control unit includes a fourth switch. The fourth switch includes a first terminal, a second terminal, and a control terminal. The first terminal of the fourth switch is connected to the driving unit, the second terminal of the fourth switch is connected to the light-emitting element, and the control terminal of the fourth switch is configured to receive a control signal.

In order to solve the above problems, in some embodiments, the present disclosure provides a display panel. The display panel includes a driving circuit and a driving chip. The driving circuit includes a plurality of sub-pixels arranged in an array. Sub-pixels in two adjacent columns are connected to a same detection line for detecting a corresponding driving current of any of the sub-pixels in the two adjacent columns. Each driving current is configured to determine a corresponding compensation signal of corresponding two adjacent sub-pixels, for compensating data driving signals of the corresponding two adjacent sub-pixels based on the corresponding compensation signal in a displaying operation. The driving chip is connected to the driving circuit, the driving chip is configured to obtain a detection driving current from the driving circuit, obtain a compensation signal based on the detection driving current, and compensate the data driving signal by the compensation signal.

Alternatively, [0040] each of the plurality of sub-pixels includes: a light-emitting element, a pre-charging unit, a driving unit and a detection unit. The pre-charging unit is connected to a data line to receive a data driving signal. The driving unit is connected to the pre-charging unit and the light-emitting element. The detection unit is connected to the driving unit and the detection line. Detection units of the sub-pixels in two adjacent columns are connected to the same detection line, and two adjacent sub-pixels are configured to simultaneously perform a detection operation. In the detection operation, a pre-charging unit of any of two adjacent sub-pixels is configured to receive a corresponding data driving signal of any of two adjacent sub-pixels through a corresponding data wire connected thereto, a driving unit of any of the two adjacent sub-pixels is configured to generate a corresponding detection driving current of any of the two adjacent sub-pixels based on the corresponding data driving signal, and a detection unit of any of the two adjacent sub-pixels is configured to detect a detection driving current generated by the corresponding driving unit connected thereto, such that the display panel determines the corresponding compensation signal of the corresponding two adjacent sub-pixels based on corresponding driving currents of the corresponding two adjacent sub-pixels and compensates the data driving signals of the corresponding two adjacent sub-pixels based on the corresponding compensation signal. In the display operation, a pre-charging unit of any of the plurality of sub-pixels is configured to receive the corresponding compensated data driving signal through the data line, and a driving unit of any of the plurality of sub-pixels is configured to generate a corresponding display driving current of any of the plurality of sub-pixels based on the corresponding compensated data driving signal to drive the light-emitting element to emit light.

Alternatively, a distance between driving units of the two adjacent sub-pixels is less than or equal to a width of a sub-pixel.

Alternatively, the driving chip is configured to performs a calculation and obtain gray scales of the plurality of sub-pixels at different positions on the display panel based on detection driving currents in a group of two adjacent sub-pixels in combination with an algorithm to obtain the corresponding compensation signal of corresponding two adjacent sub-pixels for any of the gray scales; and to compensate the data driving signals of the two adjacent sub-pixels by the corresponding compensation signal, such that when the display panel performs the display operation, the currents flowing through the light-emitting elements are the same when the gray scales at different positions are the same.

In order to solve the above problems, in some embodiments, the present disclosure provides a driving method for a driving circuit of a display panel. The method includes: two adjacent sub-pixels simultaneously performing a detection operation, and respectively obtaining detection driving currents of the two adjacent sub-pixels in one-to-one correspondence in the detection operation; determining a common compensation signal of the two adjacent sub-pixels based on the detection driving currents of the two adjacent sub-pixels; and compensating data driving signals of the two adjacent sub-pixels by the common compensation signal, and driving light-emitting element of each of the two adjacent sub-pixels to emit light, in a display operation.

In order to solve the above problems, the present disclosure provides a display panel. Referring to FIG. 1, FIG. 1 is a structural schematic view of a display panel according to a first embodiment of the present disclosure. The display panel 100 includes a driving circuit 10 and a driving chip 20. The driving chip 20 is electrically connected to the driving circuit 10. The driving chip 20 is configured to obtain a detection driving current I1 of each sub-pixel 11 from the driving circuit 10, to obtain a compensation signal V2 based on the detection driving current I1, and to compensate a data driving signal Vdata based on the compensation signal V2, such that the display panel 100 has uniform brightness in a displaying operation. Specifically, the driving circuit 10 includes a plurality of sub-pixels 11. The driving chip 20 is configured to detect and compensate the data driving signal Vdata of each sub-pixel 11 before the display panel 100 performs the display operation, such that when the display panel 100 performs the display operation, the driving current flowing through each sub-pixel 11 at different positions of the display panel 100 with a same gray scale X is the same, thereby achieving uniform brightness of the display panel 100.

Figure 2:
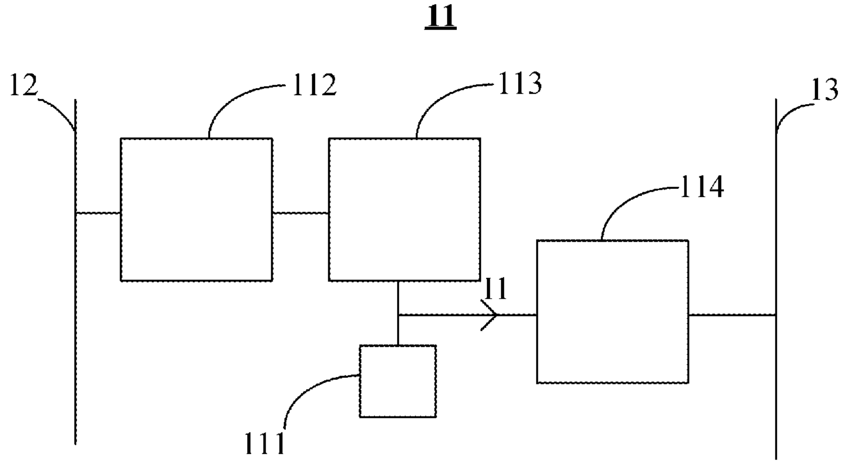
FIG. 2 is a schematic view of a circuit module of a sub-pixel in a driving circuit according to a second embodiment of the present disclosure.

Referring to FIG. 2, FIG. 2 is a schematic view of a circuit module of a sub-pixel in a driving circuit according to a second embodiment of the present disclosure. The driving circuit 10 includes a plurality of sub-pixels 11, each of the plurality of sub-pixels 11 includes a light-emitting element 111, a pre-charging unit 112, a driving unit 113, and a detection unit 114. Specifically, the pre-charging unit 112 is connected to a data line 12 to receive a data driving signal Vdata. The driving unit 113 is connected to the pre-charging unit 112 and the light-emitting element 111. The detection unit 114 is connected to the driving unit 113. In a detection operation, the pre-charging unit 112 is configured to receive the data driving signal Vdata through the data line 12, the driving unit 113 is configured to generate a corresponding detection driving current I1 based on the data driving signal Vdata, and the detection unit 114 is configured to detect the detection driving current I1 generated by the driving unit 113, such that the display panel 100 determines the compensation signal V2 of the sub-pixel 11 based on the detection driving current I1, and compensates the data driving signal Vdata by the compensation signal V2. In a display operation, the pre-charging unit 112 is configured to receive the compensated data driving signal Vdata through the data line 12, and the driving unit 113 is configured to generate a display driving current correspondingly based on the compensated data driving signal Vdata to drive the light-emitting element 111 to emit light.

Figure 3:
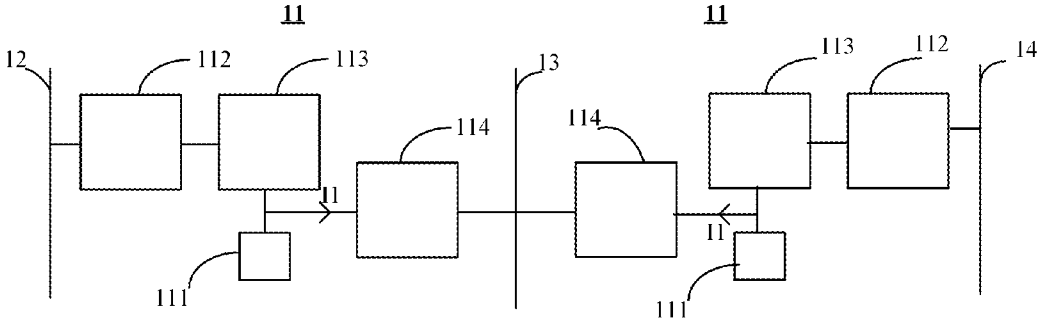
FIG. 3 is a schematic view of a circuit module with sub-pixels in two adjacent columns sharing a detection line according to a third embodiment of the present disclosure.

Considering that each sub-pixel 11 uses an independent detection line 13 to detect the detection driving current I1, not only will there be too many wires in the display panel 100, but also higher requirements for the number of channels of the driving chip 20, thereby increasing the cost, and making the application of the display panel restricted for example in the transparent display field. For this reason, in the driving circuit 10 provided by the present disclosure, referring to FIG. 3, FIG. 3 is a schematic view of a circuit module with sub-pixels in two adjacent columns sharing a detection line according to a third embodiment of the present disclosure. The driving circuit 10 includes a plurality of sub-pixels 11, each of the plurality of sub-pixels 11 includes a light-emitting element 111, a pre-charging unit 112, a driving unit 113, and a detection unit 114. In the embodiment, the plurality of sub-pixels 11 are arranged in an array, and each column of the plurality of sub-pixels 11 arranged in the array includes one sub-pixel 11. Adjacent two columns of sub-pixels 11 are commonly connected to a same detection line 13. Specifically, detection units 114 of the two adjacent columns of sub-pixels 11 are connected to the same detection line 13 to detect detection driving currents I1 of the two adjacent sub-pixels through the same detection line 13. It can be understood that if the number of the columns of the plurality of sub-pixels 11 arranged in an array is six, a plurality of sub-pixels 11 in first and second columns are a group and share a detection line 13, a plurality of sub-pixels 11 in third and fourth columns are a group and share a detection line 13, a plurality of sub-pixels 11 in fifth and sixth columns are a group and share a detection line 13, and a plurality of sub-pixels 11 in different groups do not share a detection line 13.

Two adjacent sub-pixels 11 in a same row in two adjacent columns of sub-pixels 11 simultaneously perform the detection operation. In the embodiment, in order to make characteristics of transistors in two adjacent sub-pixels 11 sharing the same detection line 13 closer, a distance between transistors in two adjacent sub-pixels 11 is set not to exceed a width of one sub-pixel 11, such that the detection driving currents I1 generated by two adjacent sub-pixels 11 are basically the same, and a compensation signal V2 of each sub-pixel 11 determined by the display panel 100 based on the corresponding detection driving currents I1 of the two adjacent sub-pixels 11 is the same, and is a common compensation signal VT. For example, each driving unit 113 includes a transistor, and a distance between driving units 113 in two adjacent sub-pixels 11 is less than or equal to the width of one sub pixel 11, that is, the distance between the transistors in two adjacent driving units 113 is less than or equal to the width of one sub pixel 11.

In the embodiment, in the detection operation, pre-charging units 112 of the two adjacent sub-pixels 11 are configured to receive data driving signals Vdata through the data wires 12 connected thereto in one-to one correspondence, that is, each pre-charging unit 112 is configured to receive the data driving signal Vdata through the data line 12 connected thereto, driving units 113 of the two adjacent sub-pixels 11 is configured to generate corresponding detection driving currents I1 based on the data driving signals Vdata connected thereto in one-to one correspondence, that is, each driving unit 113 is configured to generate a corresponding detection driving current I1 based on the data driving signal Vdata connected thereto, and detection units 114 of the two adjacent sub-pixels 11 are configured to respectively detect the detection driving currents I1 generated by the driving units 113 connected thereto in one-to one correspondence, that is, each detection unit 114 is configured to respectively detect the corresponding detection driving current I1 generated by the driving unit 113 connected thereto, such that the display panel 100 determines the common compensation signal V2' of the sub-pixels 11 based on the detection driving currents I1 of the two adjacent sub-pixels 11, and compensates the data driving signals Vdata of the two adjacent sub-pixels 11 by the common compensation signal V2'. In a display operation, the pre-charging unit 112 of each sub-pixel 11 is configured to receive the compensated data driving signal Vdata through the data line 12, and the driving unit 113 of each sub-pixel 11 is configured to corresponding generate a display driving current based on the compensated data driving signal Vdata and drive the light-emitting element 111 to emit light.

In the embodiment, since the distance between the driving units 113 in the two adjacent sub-pixels 11 is set to be less than or equal to the width of one sub pixel 11, and the characteristics of the transistors in the two adjacent sub-pixels 11 are basically the same, the detection driving currents I1 of the two adjacent sub-pixels 11 are considered to be the same, and the compensation signal for compensating the data driving signal Vdata of the two adjacent sub-pixels 11 is the same and is the common compensation signal V2'.

Figure 4:
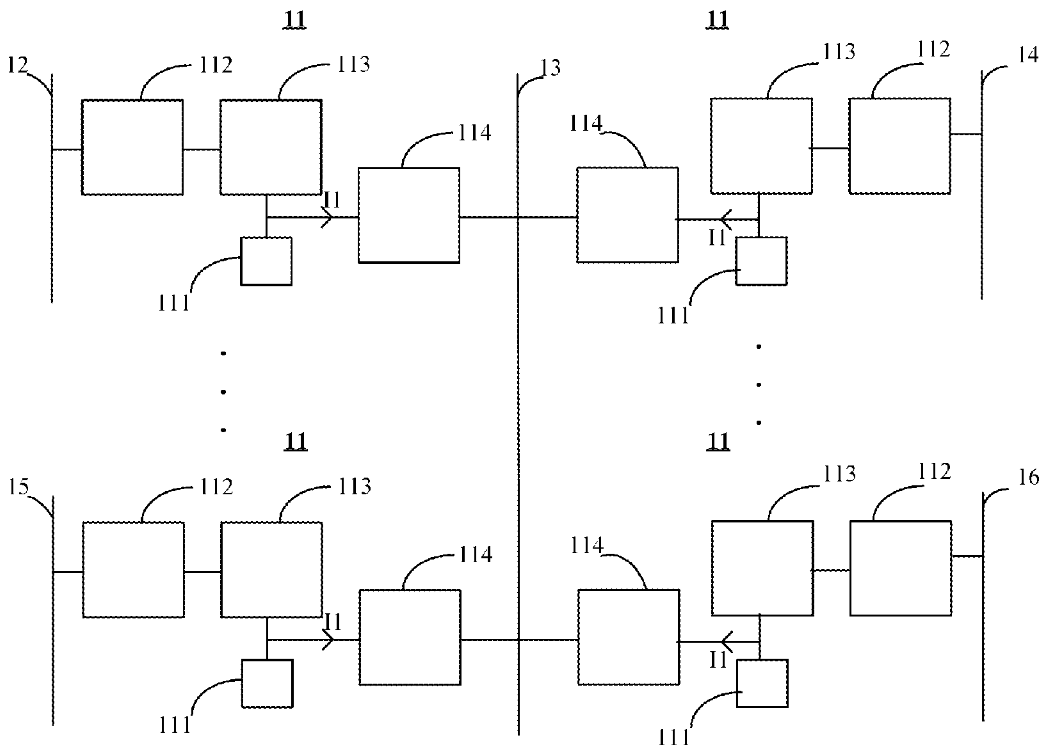
FIG. 4 is a schematic view of a circuit module with sub-pixels in two adjacent columns sharing a detection line according to a fourth embodiment of the present disclosure.

In order to further reduce the number of wires in the display panel 100, reduce the requirements for the number of channels of the driving chip 20, and reduce the cost, referring to FIG. 4. FIG. 4 is a schematic view of a circuit module with sub-pixels in two adjacent columns sharing a detection line according to a fourth embodiment of the present disclosure. The driving circuit 10 includes a plurality of sub-pixels 11, and each of the plurality of sub-pixels 11 includes a light-emitting element 111, a pre-charging unit 112, a driving unit 113, and a detection unit 114. The plurality of sub-pixels 11 are arranged in an array. Each column of the plurality of sub-pixels 11 arranged in the array includes a plurality of sub-pixels 11. Adjacent two columns of sub-pixels 11 are commonly connected to a same detection line 13. The number of sub-pixels 11 in each column may be 4, 6, 8, or the like, which is not limited here, but can be specifically designed according to actual conditions.

Of course, two adjacent sub-pixels 11 in a same row in two adjacent columns of sub-pixels 11 may be connected to a same detection line 13, and two adjacent sub-pixels 11 in different rows in two adjacent columns of sub-pixels 11 may be connected to different detection lines 13, which is not limited here.

Specifically, before or during a display operation of the display panel 100 is performed, the driving chip 20 is configured to scan and detect each sub-pixel 11 row by row, and the two adjacent sub-pixels 11 in the same row in the two adjacent columns of sub-pixels 11 are configured to simultaneously perform the detection operation and obtain the detection driving current I1 of each sub-pixel 11. For example, every time the display panel 100 is powered on and before the display panel 100 displays a normal screen, the driving circuit 10 is configured to perform the detection operation in response to the power on operation of the display panel 100 through at least one frame detection screen. Based on the detection driving currents I1 of the two adjacent sub-pixels 11, and combined with algorithm, gray scales X of the two adjacent sub-pixels 11 in the same row in the two adjacent columns of sub-pixels 11 at different positions on the display panel 100 can be obtained. A common compensation signal V2' of two adjacent sub-pixels 11 is determined for any gray scale X, such that when the display panel 100 performs a display operation, the driving current flowing through the light-emitting element 111 is the same when a same gray scale X is reached at different positions, thereby achieving uniform brightness display. For example, when the display panel 100 displays a normal screen, the driving circuit 10 is configured to perform the detection operation through at least one frame detection screen in response to the display operation of the display panel 100 reaching a preset time. Based on the detection driving currents I1 of the two adjacent sub-pixels 11, and combined with algorithm, gray scales X of the two adjacent sub-pixels 11 in the same row in the two adjacent columns of sub-pixels 11 at different positions and at different times on the display panel 100 can be obtained. A common compensation signal V2' of two adjacent sub-pixels 11 is determined for any gray scale X, and before the display panel 100 displays a next screen, the data driving signals corresponding to the two adjacent sub-pixels 11 can be compensated by the common compensation signal V2', to drive the light-emitting elements 111 of each sub-pixel 11 to emit light correspondingly, thereby ensuring that the driving currents of the light-emitting elements 111 at different positions is compensated, and that the driving currents of the light-emitting elements 111 at different times is compensated.

Figure 5:
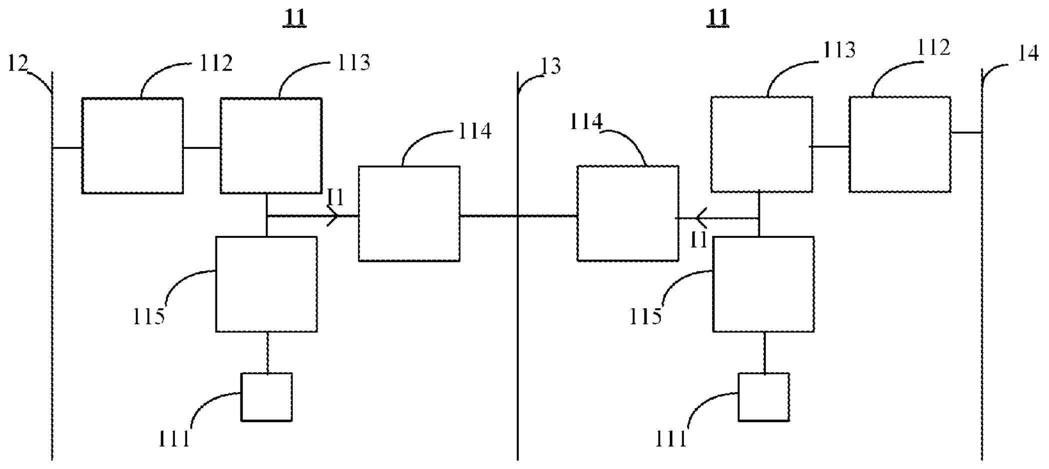
FIG. 5 is a schematic view of a circuit module of a sub-pixel in a driving circuit according to a fifth embodiment of the present disclosure.

Referring to FIG. 5, FIG. 5 is a schematic view of a circuit module of a sub-pixel in a driving circuit according to a fifth embodiment of the present disclosure. The driving circuit 10 includes a plurality of sub-pixels 11, each of the plurality of sub-pixels 11 includes a light-emitting element 111, a pre-charging unit 112, a driving unit 113, a detection unit 114, and a path control unit 115. The difference between the embodiment and the third embodiment is that each of the plurality of sub-pixels 11 further includes a path control unit 115. The path control unit 115 is connected between the driving unit 113 and the light-emitting element 111. In the detection operation, a path control units 115 of each of the two adjacent sub-pixels 11 is configured not to conduct a loop of the driving unit 113 and the light-emitting element 111 connected thereto, the detection unit 114 is configured to detect the detection driving current I1 generated by the driving unit 113 connected thereto, and output a sum of the detection driving currents I1 of the two adjacent sub-pixels 11 through the detection line 13, such that the display panel 100 determines the common compensation signal V2'. In the display operation, the path control unit 115 of each of the two sub-pixel 11 is configured to conduct the loop of driving unit 113 and the light-emitting element 111 connected thereto, and the detection unit 114 is placed in a high-impedance state. The driving unit 113 is configured to generate a display driving current based on the compensated data driving signal Vdata, and the display driving current flows through the light-emitting element 111 through the conductive path control unit 115 to drive the light-emitting element 111 to emit light. In the present disclosure, the path control unit 115 is connected between the driving unit 113 of each sub-pixel 11 and the light-emitting element 111, the path control unit 115 is non-conductive in the detection operation, such that the light-emitting element 111 does not emit light, and, the path control unit 115 is conductive in the display operation, such that the light-emitting element 111 emits light, and the current flowing through the light-emitting element 111 is the compensated current, such that the brightness of the display panel 100 is uniform.

In the embodiment, the pre-charging unit 112 of each sub-pixel 11 is connected to the first scanning line L1 to receive the first scanning signal Vscan 1, and is configured to control whether the pre-charging unit 112 is conductive based on the first scanning signal Vscan 1. The detection unit 114 of each sub-pixel 11 is connected to the second scanning line L2 to receive the second scanning signal Vscan 2, and is configured to control whether the detection unit 114 is conductive based on the second scanning signal Vscan 2. The path control unit 115 of each sub-pixel 11 is connected to the display driving line L3 to receive the display signal LC, and is configured to control whether the path control unit 115 is conductive based on the display signal LC. Two adjacent sub-pixels 11 in the same row in two adjacent columns of sub-pixels 11 simultaneously perform the detection operation. A conductive period of the second scanning signal Vscan 2 in each sub-pixel 11 is later than a conductive period of the first scanning signal Vscan 1. The display driving line L3 is configured to output the display signal LC in the display operation, that is, a conductive period of the display signal LC is later than the conductive period of the second scanning signal Vscan 2. Specifically, in a pre-charging stage of the detection operation, the detection unit 114 and the path control unit 115 of the two adjacent sub-pixels 11 are not conductive, the first scanning signal Vscan 1 of the two adjacent sub-pixels 11 controls the pre-charging unit 112 to be conductive, and receives the data driving signal Vdata, and the driving unit 113 of the two adjacent sub-pixels 11 generates the detection driving current I1 based on the data driving signal Vdata. In a detection stage of the detection operation, the first scanning signal Vscan 1 of the two adjacent sub-pixels 11 controls the pre-charging unit 112 to be non-conductive, the second scanning signal Vscan 2 of the two adjacent sub-pixels 11 controls the detection unit 114 to be conductive, and the detection unit 114 of each of the two adjacent sub-pixels 11 detects the detection driving current I1 generated by the corresponding driving unit 113 to determine the common compensation signal V. In a first stage of performing the display operation, that is, the compensation stage, the detection unit 114 and the path control unit 115 of each sub-pixel 11 are non-conductive, the first scanning signal Vscan 1 controls the pre-charging unit 112 to be conductive, the pre-charging unit 112 of each sub-pixel 11 receives the compensated data driving signal Vdata, and the driving unit 113 generates the display driving current based on the compensated data driving signal Vdata. In a second stage of performing the display operation, the first scanning signal Vscan 1 controls the pre-charging unit 112 to be non-conductive, and the second scanning signal Vscan 2 controls the detection unit 114 to be conductive, such that the driving chip 20 is in a high-impedance state. In a third stage of the display operation, that is, a display stage, the first scanning signal Vscan 1 controls the pre-charging unit 112 to be non-conductive, the second scanning signal Vscan 2 controls the detection unit 114 to be non-conductive, and the display signal LC controls the path control unit 115 to be conductive, such that the light-emitting element 111 emits light, and the current flowing through the light-emitting element 111 is the compensated current.

In the embodiment, in the detection operation, in the pre-charging stage, the pre-charging unit 112 of each of the two adjacent sub-pixels 11 is conductive based on the first scanning signal Vscan 1 to input the corresponding data driving signal Vdata to the driving unit 113 and store the corresponding data driving signal Vdata. The driving unit 113 is configured to generate the corresponding detection driving current I1 based on the data driving signal Vdata; in the detection stage, the detection unit 114 of each of the two adjacent sub-pixels 11 is conductive based on the second scanning signal Vscan 2 to output the sum of the detection driving currents I1 of the two adjacent sub-pixels 11 to the driving chip 20 of the display panel 100 through the detection line 13, thereby determining the common compensation signal V2' the sub-pixels 11, and compensating the data driving signal Vdata by the common compensation signal V2'. In the display operation, in the compensation stage, the pre-charging unit 112 of each sub-pixel 11 is conductive based on the first scanning signal Vscan 1 to input the compensated data driving signal Vdata to the driving unit 113 and store the compensated data driving signal Vdata. The driving unit 113 is configured to generate a corresponding display driving current based on the compensated data driving signal Vdata to drive the light-emitting element 111 to emit light.

In the display operation, the driving chip 20 of the display panel 100 is in a high-impedance state during the detection unit 114 of each sub-pixel 11 is conductive based on the second scanning signal Vscan 2, that is, the driving circuit 10 and the driving chip 20 are in an open-circuit state, to avoid affecting the light-emitting element 111 to emit light. In the embodiment, the first scanning signal Vscan 1 and the second scanning signal Vscan 2 may be scanning signals respectively provided by two adjacent scan lines, that is, an enabling period of the second scanning signal Vscan 2 may follow an enabling period of the first scanning signal Vscan 1. In addition, an enabling period of the display signal LC may be later than the enabling periods of the first scanning signal Vscan 1 and the second scanning signal Vscan 2, and in the display operation, the path control unit 115 is conductive during the enabling period of the display signal LC, and the light-emitting element 111 emits light.

Figure 6:
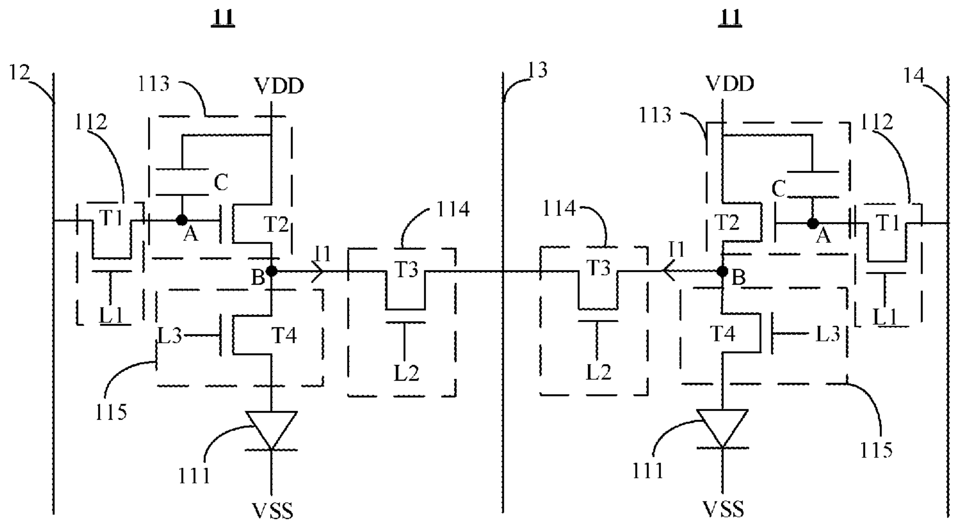
FIG. 6 is a specific circuit view of a detection line shared by two adjacent columns of sub-pixels as shown in FIG. 5.
Figure 7:
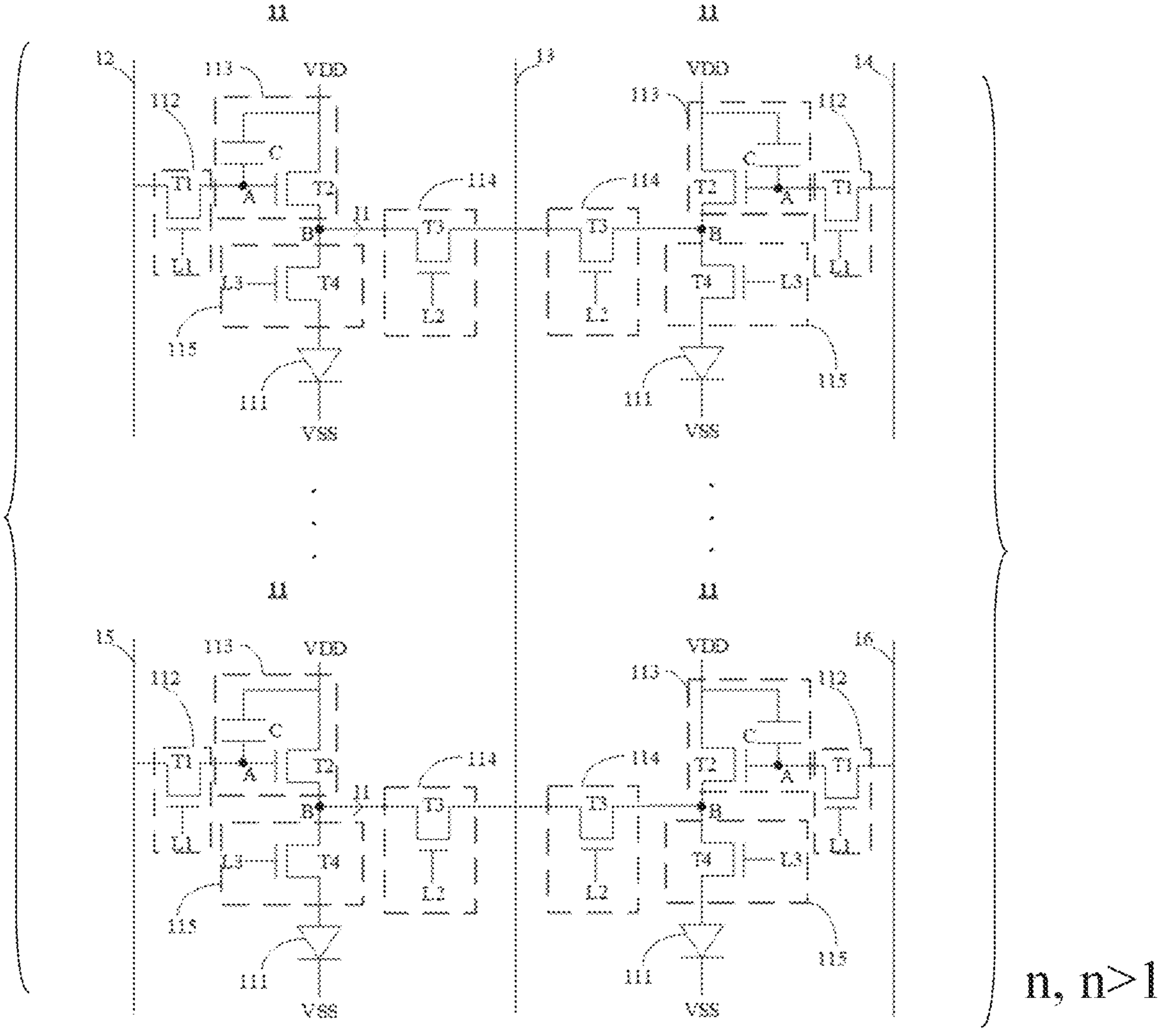
FIG. 7 is a specific circuit view of a detection line shared by two adjacent columns of sub-pixels according to a sixth embodiment of the present disclosure.

Referring to FIG. 6 and FIG. 7, FIG. 6 is a specific circuit view of a detection line shared by two adjacent columns of sub-pixels as shown in FIG. 5. FIG. 7 is a specific circuit view of a detection line shared by two adjacent columns of sub-pixels according to a sixth embodiment of the present disclosure. The difference between the specific circuit view shown in sixth embodiment and the specific circuit view shown in fifth embodiment is that each column of the plurality of sub-pixels 11 arranged in an array provided in sixth embodiment includes a plurality of sub-pixels 11, and two adjacent columns of sub-pixels 11 are commonly connected to a same detection line 13. Specifically, the pre-charging unit 112 of each sub-pixel 11 includes a first switch T1, and the first switch T1 includes a first terminal, a second terminal, and a control terminal. The first terminal of the first switch T1 is connected to the data line 12, the second terminal of the first switch T1 is connected to the driving unit 113, and the control terminal of the first switch T1 is configured to receive the first scanning signal Vscan 1. A connection point between the driving unit 113 and the pre-charging unit 112 is defined as a first node A. The driving unit 113 of each sub-pixel 11 includes a second switch T2 and a capacitor C. The second switch T2 includes a first terminal, a second terminal and a control terminal. The first terminal of the second switch T2 is connected to a first voltage source VDD, the second terminal of the second switch T2 is connected to the detection unit 114, and the control terminal of the second switch T2 is connected to the pre-charging unit 112. The capacitor C includes a first terminal connected to the first terminal of the second switch T2 and a second terminal connected to the control terminal of the second switch T2. A connection point between the driving unit 113 and the detecting unit 114 is defined as the second node B. The detection unit 114 of each sub-pixel 11 includes a third switch T3, and the third switch T3 includes a first terminal, a second terminal and a control terminal. The first terminal of the third switch T3 is connected to the driving unit 113, the second terminal of the third switch T3 is connected to the detection line 13, and the control terminal of the third switch T3 is configured to receive the second scanning signal Vscan 2. The path control unit 115 of each sub-pixel 11 includes a fourth switch T4, and the fourth switch T4 includes a first terminal, a second terminal, and a control terminal. The first terminal of the fourth switch T4 is connected to the driving unit 113, the second terminal of the fourth switch T4 is connected to a first terminal of a light-emitting element 111, a second terminal of the light-emitting element 111 is also connected to the second voltage source VSS, and the control terminal of the fourth switch T4 is configured to receive a control signal, that is, a display signal LC. The first terminal of the light-emitting element 111 of each sub-pixel 11 is connected to the path control unit 115, and the second terminal of the light-emitting element 111 is also connected to the second voltage source VSS.

The light-emitting element 111 may be a light emitting diode (LED). The first switch T1, the second switch T2, the third switch T3, and the fourth switch T4 may all be N-type transistors, or may all be P-type transistors. Alternatively, at least one of the first switch T1, the second switch T2, the third switch T3, and the fourth switch T4 may be each an N-type transistor, and the other may be each a P-type transistor. The present disclosure takes them as N-type transistors as an example for description.

Figure 8:
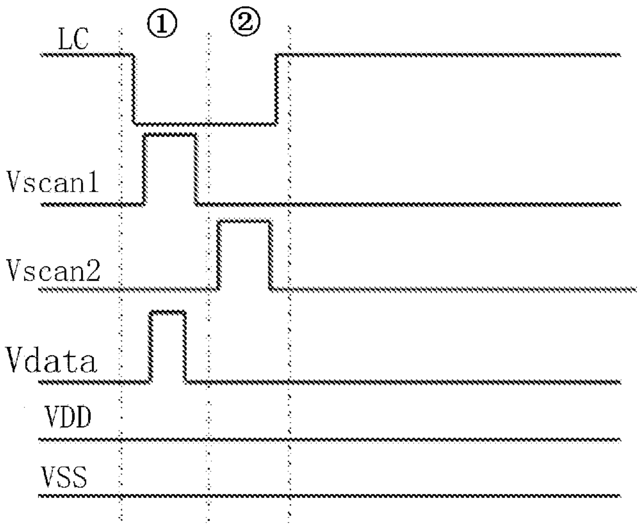
FIG. 8 is a timing diagram of the driving circuit when performing a detection operation according to the fifth embodiment of the present disclosure.
Figure 9:
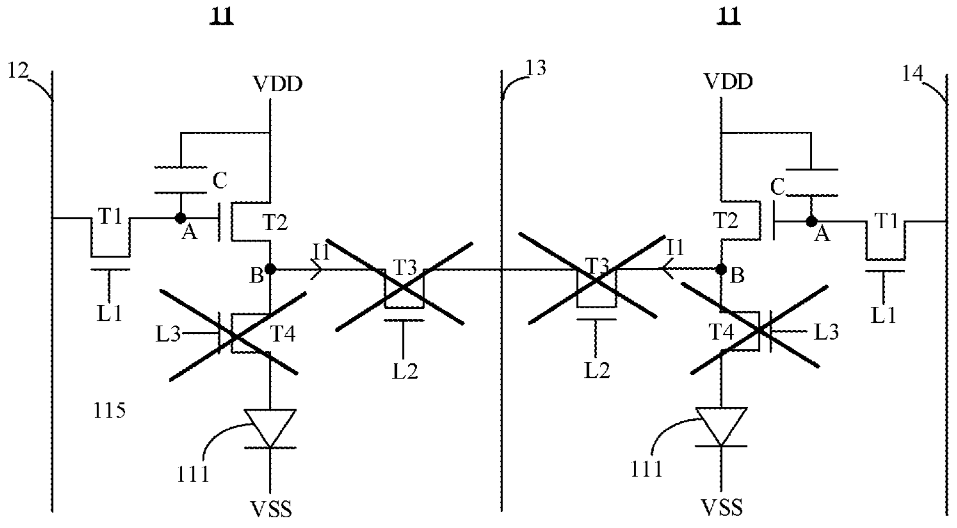
FIG. 9 is an on-off schematic view of switches in the driving circuit at a pre-charging stage when performing the detection operation according to the fifth embodiment of the present disclosure.
Figures 10, 11, 12:
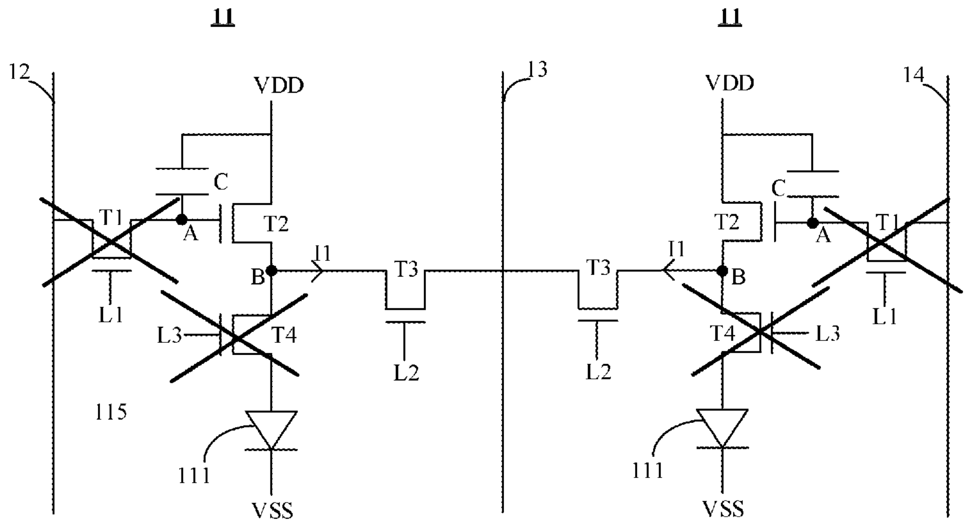
FIG. 10 is an on-off schematic view of switches in the driving circuit at a detection stage when performing the detection operation according to the fifth embodiment of the present disclosure.
FIG. 11 is a schematic view of a detection data table formed by a driving chip after the driving circuit performs the detection operation according to the fifth embodiment of the present disclosure.
FIG. 12 is a schematic view of a compensation data table formed by the driving chip after the driving circuit performs the detection operation according to the fifth embodiment of the present disclosure.
Figure 13:
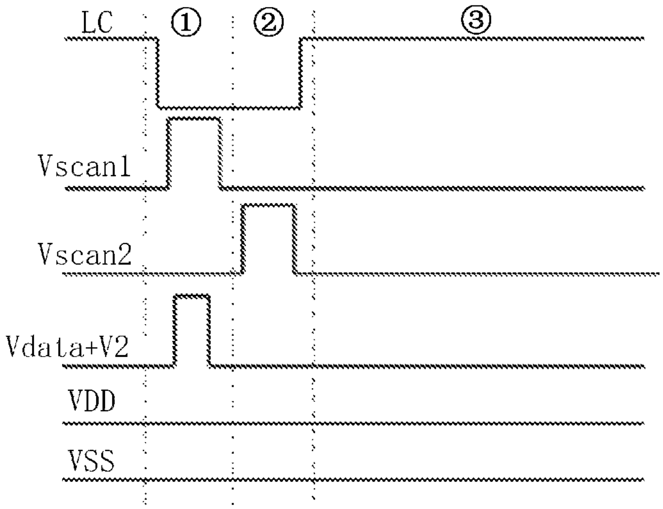
FIG. 13 is a timing diagram of the driving circuit when performing the display operation according to the fifth embodiment of the present disclosure.

Referring to FIGS. 8-10, FIG. 8 is a timing diagram of the driving circuit when performing a detection operation according to the fifth embodiment of the present disclosure, FIG. 9 is an on-off schematic view of switches in the driving circuit at a pre-charging stage when performing the detection operation according to the fifth embodiment of the present disclosure, and FIG. 10 is an on-off schematic view of switches in the driving circuit at a detection stage when performing the detection operation according to the fifth embodiment of the present disclosure. Specifically, in the pre-charging phase ① of the detection operation, the first scanning signal Vscan 1 of the two adjacent sub-pixels 11 is at a high voltage, the first switch T1 is turned on, and the data line 12 outputs the data driving signal Vdata. For example, the data line 12 outputs a preset voltage, and the data driving signal Vdata is written to the first node A through the first switch T1. At this time, the second scanning signal Vscan 2 of the two adjacent sub-pixels 11 is at a low voltage, and the third switch T3 is turned off, The fourth switch T4 receives the control signal and is in a non-conductive state after, and no current flows through the second node B. In the detection stage ② of the detection operation, the first scanning signal Vscan 1 of the two adjacent sub-pixels 11 is at a low voltage, the first switch T1 is turned off, the data driving signal Vdata of the first node A is stored in the capacitor C, and at this time, the second scanning signal Vscan 2 of the two adjacent sub-pixels 11 is at a high voltage, the third switch T3 is turned on, and the second switch T2 is in a conductive state under the control of the data driving signal Vdata, and there will be a current flowing through the second node B, and the current is the detection driving current I1. The detection unit 114 of the two adjacent sub-pixels 11 is conductive based on the second scanning signal Vscan 2 to output a sum of the detection driving currents I1 of the two adjacent sub-pixels 11 to the driving chip 20 through the detection line 13. At this time, the fourth switch T4 receives the control signal and is still in a non-conductive state after receiving, and the light-emitting element 111 will not emit light. Referring to FIG. 11, FIG. 11 is a schematic view of a detection data table formed by the driving chip after the driving circuit performs the detection operation according to the fifth embodiment of the present disclosure. By the above two-stage detection operation being performed, two adjacent sub-pixels 11 are taken as a group and a row-by-row scanning detection of the plurality of sub-pixels 11 is realized, such that the detection driving current I1 of all sub-pixels 11 in the entire display panel 100 can be detected and recorded in the driving chip 20, and a detection data table M1 can be formed.

Further, referring to FIG. 12, FIG. 12 is a schematic view of a compensation data table formed by the driving chip after the driving circuit performs the detection operation according to the fifth embodiment of the present disclosure. The driving chip 20 performs a calculation and obtains gray scales X of the sub-pixels 11 at different positions on the display panel 100 based on detection driving currents I1 in a group of two adjacent sub-pixels 11 in combination with an algorithm. For any gray scale X, the common compensation signal VT of the two adjacent sub-pixels 11 is obtained, and the driving chip 20 compensates the data driving signals Vdata of the two adjacent sub-pixels 11 by the common compensation signal VT to form a compensation data table M2, such that when the display panel 100 performs the display operation, the currents flowing through the light-emitting elements 111 are the same when the gray scales X at different positions are the same, thereby realizing uniform brightness display. Specifically, when the data driving signal Vdata is input to the driving chip 20, the driving chip 20 compensates a compensation voltage into the data driving signal Vdata, so as to realize the voltage compensation of the driving chip 20 to the first node A in the sub-pixels 11 at different positions of the display panel 100, such that in the display operation, the driving currents flowing through the light-emitting elements 111 are the same when the gray scales X at different positions are the same, so as to achieve uniform brightness display.

Figure 14:
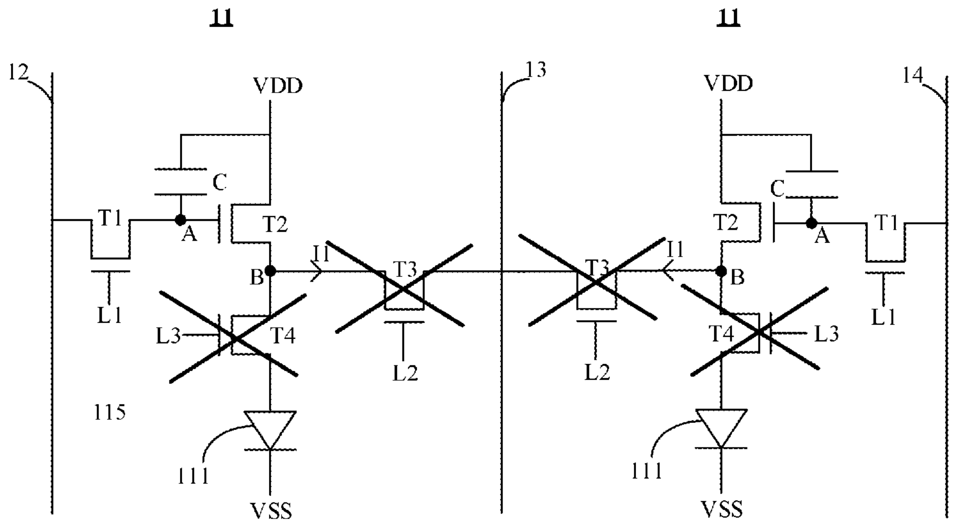
FIG. 14 is an on-off schematic view of switches in the driving circuit in a first stage of performing a display operation according to the fifth embodiment of the present disclosure.
Figure 15:
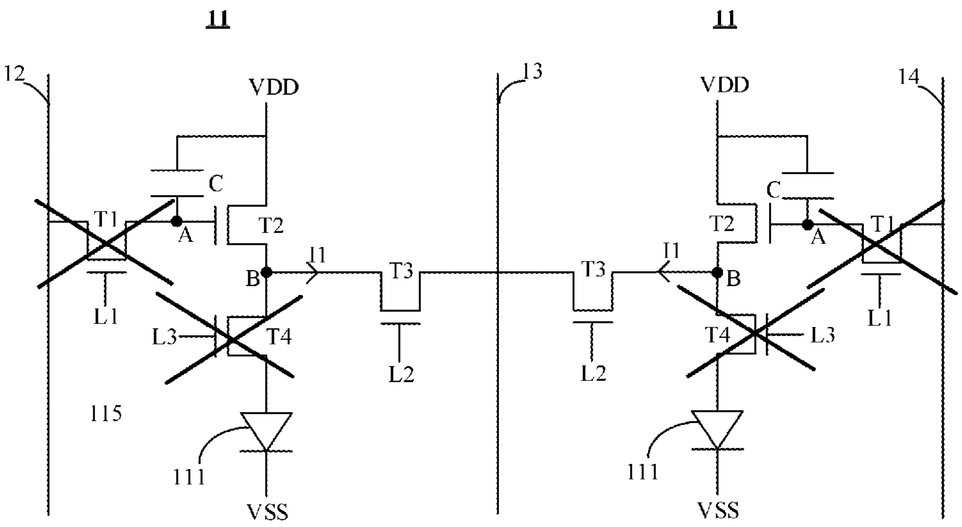
FIG. 15 is an on-off schematic view of switches in the driving circuit in a second stage of performing the display operation according to the fifth embodiment of the present disclosure.
Figure 16:
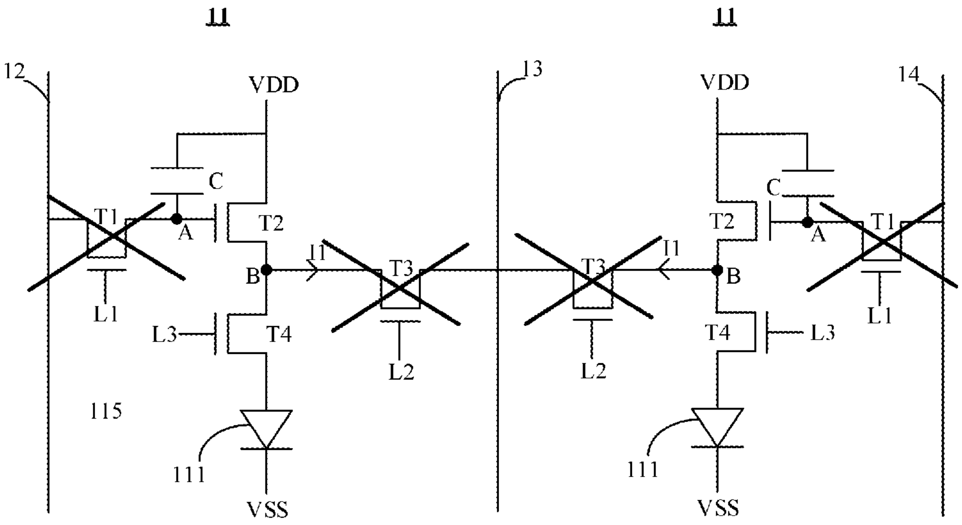
FIG. 16 is an on-off schematic view of switches in the driving circuit in a third stage of performing the display operation according to the fifth embodiment of the present disclosure.

Referring to FIG. 13 to FIG. 16, FIG. 13 is a timing diagram of the driving circuit when performing the display operation according to the fifth embodiment of the present disclosure, FIG. 14 is an on-off schematic view of switches in the driving circuit in a first stage of performing a display operation according to the fifth embodiment of the present disclosure, FIG. 15 is an on-off schematic view of switches in the driving circuit in a second stage of performing the display operation according to the fifth embodiment of the present disclosure, and FIG. 16 is an on-off schematic view of switches in the driving circuit in a third stage of performing the display operation according to the fifth embodiment of the present disclosure. Specifically, in the first stage 10 of the display operation, the first scanning signal Vscan 1 of the two adjacent sub-pixels 11 is at a high voltage, at this time, the first switch T1 is turned on, the data driving signal Vdata is the data driving signal Vdata after being overcompensated, at this time, the second scanning signal Vscan 2 of the two adjacent sub-pixels 11 is at a low voltage, the third switch T3 is turned off, and the fourth switch T4 receives the control signal and is in a non-conductive state, and the light-emitting element 111 does not emit light. In the second stage ② of the display operation, the first scanning signal Vscan 1 of the two adjacent sub-pixels 11 is at a low voltage, the first switch T1 is turned off, the second scanning signal Vscan 2 of the two adjacent sub-pixels 11 is at a high voltage, the third switch T3 is turned on, and the second switch T2 is in a conductive state under the control of the data driving signal Vdata, at this time, the second node B is the display driving current, when the detection units 114 of the two adjacent sub-pixels 11 are conductive based on the second scanning signal Vscan 2, the driving chip 20 is in a high-impedance state, and the light-emitting element 111 does not emit light. In the third stage ③ of the display operation, the first scanning signal Vscan 1 and the second scanning signal Vscan 2 of the two adjacent sub-pixels 11 are both at low voltages, the first switch T1 and the third switch T3 are turned off, and the fourth switch T4 receives the control signal and is in a conductive state after. The display driving current flows through the light-emitting element 111, and the light-emitting element 111 emits light with a compensated brightness.

Figure 17:
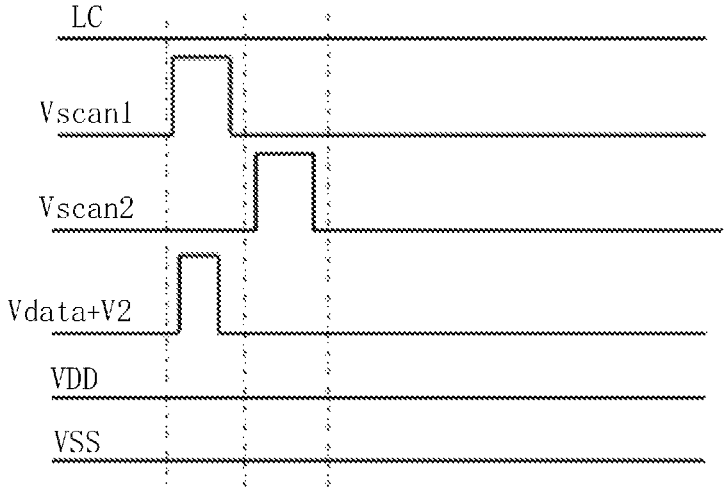
FIG. 17 is a timing diagram when a driving circuit performs a display operation according to a seventh embodiment of the present disclosure.

In one embodiment, referring to FIG. 17, FIG. 17 is a timing diagram when a driving circuit performs a display operation according to a seventh embodiment of the present disclosure. Unlike the display signal LC received by the control terminal of the fourth switch T4 in fifth embodiment, which is a pulse timing signal, in the embodiment, the display signal LC received by the control terminal of the fourth switch T4 is a relatively simple direct-current (DC) signal. That is, when the detection operation and the compensation operation are performed, The display signal LC received by the control terminal of the fourth switch T4 is at a DC high voltage.

Figure 18:
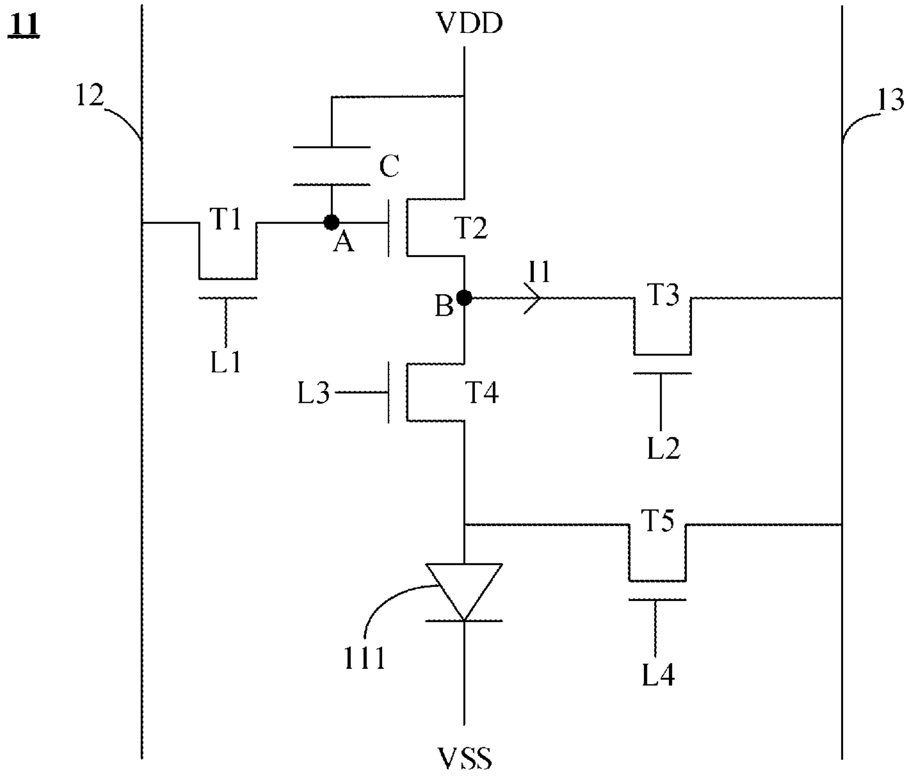
FIG. 18 is a specific circuit view of a sub-pixel according to an eighth embodiment of the present disclosure.

Referring to FIG. 18, FIG. 18 is a specific circuit view of a sub-pixel according to an eighth embodiment of the present disclosure. In order to avoid the influence of the fourth switch T4 on the display driving current, each sub-pixel 11 further includes a fifth switch T5 and a third scanning line L4. The fifth switch T5 includes a first terminal, a second terminal and a control terminal. The first terminal of the fifth switch T5 is connected to the second terminal of the fourth switch T4, the second terminal of the fifth switch T5 is connected to the detection line 13, and the control terminal of the fifth switch T5 is connected to the third scanning line L4 to receive the third scanning signal Vscan 4. The third scanning signal Vscan 4 is configured to control the fifth switch T5 to be turned on. Specifically, the third switch T3 and the fifth switch T5 of each sub-pixel 11 are connected to the same detection line 13. When the fourth switch T4 is turned on, the third scanning signal Vscan 4 is configured to control the fifth switch T5 to be turned on, the fifth switch T5 is configured to detect the display driving current, and the fifth switch T5 is turned on based on the third scanning signal Vscan 4 to output the display driving current to the driving chip 20 through the detection line 13, thereby determining whether the display driving current is a preset display driving current, When the driving chip 20 detects the display driving current, the fifth switch T5 is turned off based on the third scanning signal Vscan 4 to avoid affecting the light-emitting element 111 to emitting light. It can be understood that when the driving chip 20 detects that the display driving current is different from the preset display driving current, the driving chip 20 is further configured to perform a calculation in combination with an algorithm and obtain the gray scales X of the sub-pixels 11 at different positions on the display panel 100. The driving chip 20 may compensate any grayscale X, such that when the display panel 100 performs a next frame display operation, the driving currents flowing through the light-emitting elements 111 are the same when the gray scales X at different positions are the same, so as to achieve uniform brightness display.

The driving circuit 10 of the display panel 100 provided by the present disclosure includes a plurality of sub-pixels 11, the plurality of sub-pixels 11 are arranged in an array, and sub-pixels in two adjacent columns 11 are commonly connected to a same detection line 13 to detect detection driving currents I1 of the sub-pixels in two adjacent columns 11 through the same detection line 1. The detection driving current I1 is configured to determine the compensation signal V2 of the sub-pixel 11, and the data driving signal Vdata is compensated based on the compensation signal V2 in the display operation. By detecting and compensating the data driving signal Vdata of each sub-pixel 11 before the display panel 100 performs the display operation, the present disclosure solves the problem that the brightness of the display panel 100 is nonuniform due to the different driving currents of the plurality of sub-pixel 11 at different positions and at different times when the display panel 100 performs the display operation, and because the two adjacent columns of sub-pixel 11 in the driving circuit 10 are connected to the same detection line 13, the number of wires in the display panel 100 is greatly reduced, and thus the demand for the number of channels of the driving chip 20 in the display panel 100 is reduced, thereby reducing costs.

Figure 19:
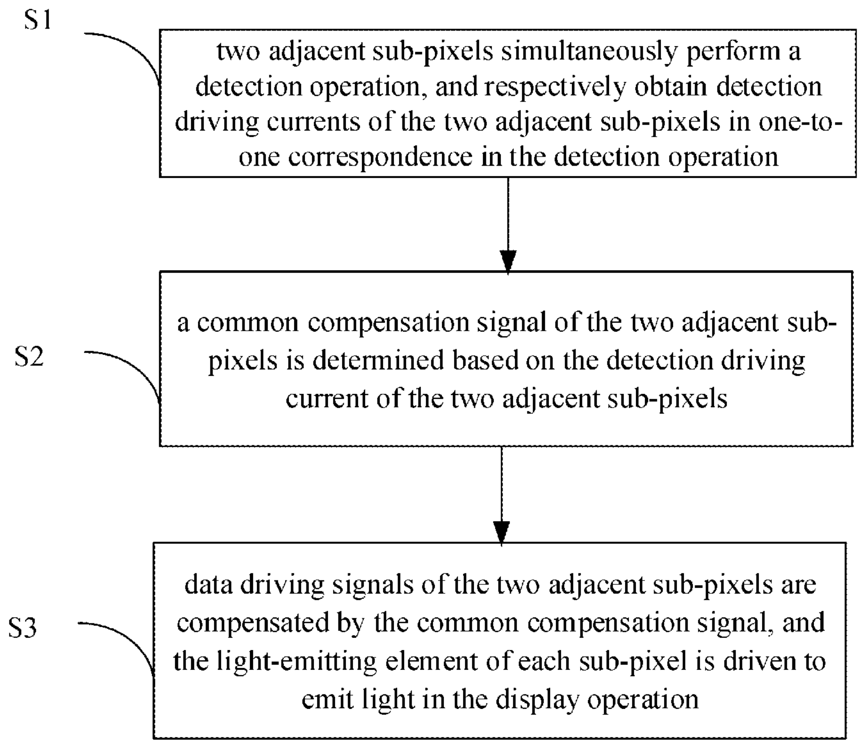
FIG. 19 is a flowchart of a driving method for a driving circuit according to an embodiment 9 of the present disclosure.

Referring to FIG. 19, FIG. 19 is a flowchart of a driving method for a driving circuit according to an embodiment 9 of the present disclosure. The method includes operations at blocks illustrated herein.

At block S1: two adjacent sub-pixels simultaneously perform a detection operation, and respectively obtain detection driving currents of the two adjacent sub-pixels in one-to-one correspondence in the detection operation.

Specifically, in the detection operation, the pre-charging units of the two adjacent sub-pixels in a same row in two adjacent columns are conductive in a pre-charging stage based on a first scanning signal and input data driving signals to the driving unit and store the data driving signals, and the driving units are configured to generate the detection driving currents based on the data driving signal in one-to-one correspondence. In a detection stage, the detection units of the two adjacent sub-pixels are conductive based on a second scanning signal to output a sum of the detection driving currents of the two adjacent sub-pixels to the driving chip through the detection line.

Specifically, before or during the display operation of the display panel, the driving chip are configured to scan and detect each sub-pixel row by row, and the two adjacent sub-pixels in the same row in the two adjacent columns of sub-pixels are configured to simultaneously perform the detection operation and obtain the detection driving current of each sub-pixel.

At block S2: a common compensation signal of the two adjacent sub-pixels is determined based on the detection driving current of the two adjacent sub-pixels.

Specifically, the driving chip performs a calculation and obtains gray scales of the sub-pixels at different positions on the display panel based on detection driving currents in a group of two adjacent sub-pixels in combination with an algorithm, and the common compensation signal of the two adjacent sub-pixels for any gray scale is determined, and the driving chip compensates the data driving signals of the two adjacent sub-pixels respectively through the common compensation signal.

At block S3: data driving signals of the two adjacent sub-pixels are compensated by the common compensation signal, and the light-emitting element of each sub-pixel is driven to emit light in the display operation.

Specifically, In the display operation, in the compensation stage, the pre-charging unit of each of the two sub-pixels is conductive based on the first scanning signal to input the compensated data driving signal to the driving unit and store the compensated data driving signal. The driving unit is configured to generate the display driving current based on the compensated data driving signal to drive the light-emitting element to emit light.

In the display operation, the driving chip of the display panel is in a high-impedance state during the detection unit of each sub-pixel is conductive based on the second scanning signal, that is, the driving circuit and the driving chip are in an open-circuit state, to avoid affecting the light-emitting element to emit light. The first scanning signal and the second scanning signal may be scanning signals respectively provided by two adjacent scan lines, that is, an enabling period of the second scanning signal may follow an enabling period of the first scanning signal. In addition, an enabling period of the display signal may be later than the enabling periods of the first scanning signal and the second scanning signal, and in the display operation, the path control unit is conductive during the enabling period of the display signal, and the light-emitting element emits light.

The driving method for the driving circuit provided by the present disclosure includes: two adjacent sub-pixels simultaneously performing a detection operation, and respectively obtaining detection driving currents of the two adjacent sub-pixels in one-to-one correspondence in the detection operation; determining a common compensation signal of two adjacent sub-pixels based on the detection driving currents of the two adjacent sub-pixels; and compensating data driving signals of the two adjacent sub-pixels by the common compensation signal, and driving light-emitting element of each of the two adjacent sub-pixels to emit light, in a display operation. By simultaneously detecting and compensating the data driving signals of two adjacent sub-pixels in the same row in two adjacent columns before the display panel performs the display operation, the problem of nonuniform brightness of the display panel caused by different data driving signals of the plurality of sub-pixels at different positions and at different times when the display panel performs the display operation is solved.

The above is only some embodiments of the present disclosure and is not intended to limit the scope of the present disclosure. Any equivalent structure or equivalent process transformation using the specification and the accompanying drawings of the present disclosure, or direct or indirect application in other related technical fields, is included in the scope of the present disclosure.

What is claimed is:

1. A driving circuit, comprising a plurality of sub-pixels arranged in an array, wherein sub-pixels in two adjacent columns are connected to a same detection line for simultaneously detecting a corresponding driving current of any of the sub-pixels in the two adjacent columns;

wherein each driving current is configured to determine a corresponding compensation signal of corresponding two adjacent sub-pixels, for compensating data driving signals of the corresponding two adjacent sub-pixels based on the corresponding compensation signal in a display operation;

wherein each of the plurality of sub-pixels comprises:

a light-emitting element;

a pre-charging unit, connected to a data line to receive a data driving signal;

a driving unit, connected to the pre-charging unit and the light-emitting element; and a detection unit, connected to the driving unit and the detection line;

a path control unit, connected between the driving unit and the light-emitting element;

wherein detection units of the sub-pixels in two adjacent columns are connected to the same detection line, and two adjacent sub-pixels are configured to simultaneously perform a detection operation; in the detection operation, a pre-charging unit of any of two adjacent sub-pixels is configured to receive a corresponding data driving signal of any of two adjacent sub-pixels through a corresponding data line connected thereto, a driving unit of any of the two adjacent sub-pixels is configured to generate a corresponding detection driving current of any of the two adjacent sub-pixels based on the corresponding data driving signal, and a detection unit of any of the two adjacent sub-pixels is configured to detect a detection driving current generated by the corresponding driving unit connected thereto, such that the display panel determines the corresponding compensation signal of the corresponding two adjacent sub-pixels based on corresponding driving currents of the corresponding two adjacent sub-pixels and compensates the data driving signals of the corresponding two adjacent sub-pixels based on the corresponding compensation signal; and in the detection operation, a path control unit of any of two adjacent sub-pixels is configured not to conduct a loop where a corresponding driving unit and a corresponding light-emitting element of any of two adjacent sub-pixels are located, and a corresponding detection unit of any of two adjacent sub-pixels is configured to detect the detection driving current generated by the corresponding driving unit connected thereto, and output a sum of the detection driving currents of the corresponding two adjacent sub-pixels through the detection line, such that the display panel determines the corresponding compensation signal of the corresponding two adjacent sub-pixels; in the display operation, a path control unit of any of the plurality of sub-pixels is configured to conduct the loop where a corresponding driving unit and a corresponding light-emitting element of any of the plurality of sub-pixels are located, and the corresponding driving unit is in a high-impedance state, the corresponding driving unit is configured to generate the corresponding display driving current of any of the plurality of sub-pixels based on the corresponding compensated data driving signal, and the corresponding display driving current flows through the corresponding light-emitting element of any of the plurality of sub-pixels through a conductive path control unit of any of the plurality of sub-pixels, to drive the corresponding light-emitting element to emit light;

in the display operation, a pre-charging unit of any of the plurality of sub-pixels is configured to receive the corresponding compensated data driving signal through the data line, and a driving unit of any of the plurality of sub-pixels is configured to generate a corresponding display driving current of any of the plurality of sub-pixels based on the corresponding compensated data driving signal to drive the light-emitting element to emit light;

the pre-charging unit comprises:

a first switch, comprising a first terminal, a second terminal, and a control terminal; wherein the first terminal of the first switch is connected to the data line, the second terminal of the first switch is connected to the driving unit, and the control terminal of the first switch is configured to receive a first scanning signal;

the driving unit comprises:

a second switch, comprising a first terminal, a second terminal, and a control terminal; wherein the first terminal of the second switch is connected to a first voltage source, the second terminal of the second switch is connected to the detection unit, and the control terminal of the second switch is connected to the pre-charging unit; and a capacitor, comprising a first terminal and a second terminal; wherein the first terminal of the capacitor is connected to the first terminal of the second switch, and the second terminal of the capacitor is connected to the control terminal of the second switch;

the detection unit comprises:

a third switch, comprising a first terminal, a second terminal, and a control terminal; wherein the first terminal of the third switch is connected to the driving unit, the second terminal of the third switch is connected to the detection line, and the control terminal of the third switch is configured to receive a second scanning signal;

the path control unit comprises:

a fourth switch, comprising a first terminal, a second terminal, and a control terminal; wherein the first terminal of the fourth switch is connected to the driving unit, the second terminal of the fourth switch is connected to the light-emitting element, and the control terminal of the fourth switch is configured to receive a control signal;

wherein in a pre-charging phase of the detection operation, in each of the two adjacent sub-pixels, the first scanning signal thereof is at a high voltage, the first switch thereof is turned on, the data line thereof outputs the data driving signal, and the data driving signal is written to a first node thereof through the first switch, the first node is defined by a connection point between the driving unit thereof and the pre-charging unit thereof; at this time, the second scanning signal thereof is at a low voltage, and the third switch thereof is turned off, the fourth switch thereof receives the control signal and is in a non-conductive state after, and no current flows through a second node thereof, the second node is defined by a connection point between the driving unit thereof and the detecting unit thereof;

in a detection stage of the detection operation, in each of the two adjacent sub-pixels, the first scanning signal thereof is at a low voltage, the first switch thereof is turned off, the data driving signal of the first node thereof is stored in the capacitor thereof, and at this time, the second scanning signal thereof is at a high voltage, the third switch thereof is turned on, and the second switch thereof is in a conductive state under the control of the data driving signal, and a current flows through the second node thereof, and the current is detection driving current; the detection unit thereof is conductive based on the second scanning signal to output a sum of the detection driving currents of the two adjacent sub-pixels to the driving chip through the detection line; at this time, the fourth switch thereof receives the control signal and is still in a non-conductive state after receiving, and the light-emitting element does not emit light.

2. The driving circuit as claimed in claim 1, wherein a distance between driving units of the two adjacent sub-pixels is less than or equal to a width of a sub-pixel.

3. The driving circuit as claimed in claim 1, wherein the pre-charging unit of any of the plurality of sub-pixels is connected to a first scanning line to receive the first scanning signal and is configured to control whether the pre-charging unit of any of the plurality of sub-pixels is conductive based on the first scanning signal;

the detection unit of any of the plurality of sub-pixels is connected to a second scanning line to receive the second scanning signal, and is configured to control whether the detection unit of any of the plurality of sub-pixels is conductive based on the second scanning signal; and wherein a conductive period of the second scanning signal is later than a conductive period of the first scanning signal.

4. The driving circuit as claimed in claim 3, wherein in the detection operation, in a pre-charging stage, the detection units of the sub-pixels in two adjacent columns are conductive based on the first scanning signal to input the corresponding data driving signal of any of the sub-pixels in two adjacent columns to the corresponding driving unit and store the corresponding data driving signal, and the corresponding driving unit is configured to generate a corresponding detection driving current based on the corresponding data driving signal; in a detection stage, the detection units of the two adjacent sub-pixels are conductive based on the second scanning signal to output a sum of corresponding detection driving currents of the two adjacent sub-pixels to a driving chip of the display panel through the detection line, to determine the corresponding compensation signal of corresponding two adjacent sub-pixels for compensating the data driving signals of the corresponding two adjacent sub-pixels based on the corresponding compensation signal; and in the display operation, in the pre-charging stage, the pre-charging unit of any of the plurality of sub-pixels is conductive based on the first scanning signal to input the corresponding compensated data driving signal of any of the sub-pixels in two adjacent columns to the corresponding driving unit and store the corresponding compensated data driving signal, and the corresponding driving unit is configured to generate the corresponding display driving current based on the compensated data driving signal and drive the corresponding light-emitting element to emit light; and the detection unit is configured to determine that the driving chip of the display panel is in a high-impedance state when the detection unit of any of the plurality of sub-pixels is conductive based on the second scanning signal.

5. The driving circuit as claimed in claim 3, wherein the pre-charging unit of any of the plurality of sub-pixels comprises a first switch, and the first switch is connected to the data line and the driving unit, and is configured to receive the first scanning signal;

the driving unit of any of the plurality of sub-pixels comprises a second switch and a capacitor, the second switch is connected to a first voltage source, the detection unit and the pre-charging unit of any of the plurality of sub-pixels; the capacitor is connected to the second switch;

the detection unit of any of the plurality of sub-pixels comprises a third switch, and the third switch is connected to the corresponding driving unit of any one of the plurality of sub-pixels and the detection line, and is configured to receive the second scanning signal; and a path control unit of any of the plurality of sub-pixels comprises a fourth switch, and the fourth switch is connected to the corresponding driving unit and the corresponding light-emitting element of any one of the plurality of sub-pixels, the light-emitting element is also connected to a second voltage source, and the fourth switch is configured to receive a display signal.

6. The driving circuit as claimed in claim 3, wherein the path control unit of any of the plurality of sub-pixels is connected to a display driving line to receive a display signal, and is configured to determine whether the path control unit of any of the plurality of sub-pixels is conductive based on the display signal; a conductive period of the display signal is later than the conductive period of the second scanning signal.

7. The driving circuit as claimed in claim 6, wherein an enabling period of the second scanning signal follows an enabling period of the first scanning signal; an enabling period of the display signal is later than the enabling period of the first scanning signal and the enabling period of the second scanning signal.

8. The driving circuit as claimed in claim 1, wherein the driving circuit is configured to perform the detection operation through at least one detection screen in response to a power on operation of the display panel through at least one frame detection screen.

9. The driving circuit as claimed in claim 1, wherein the driving circuit is configured to perform the detection operation through at least one frame detection screen in response to the display operation of the display panel reaching a preset time.

10. A display panel, comprising:

a driving circuit, comprising a plurality of sub-pixels arranged in an array, wherein sub-pixels in two adjacent columns are connected to a same detection line for simultaneously detecting a corresponding driving current of any of the sub-pixels in the two adjacent columns; wherein each driving current is configured to determine a corresponding compensation signal of corresponding two adjacent sub-pixels, for compensating data driving signals of the corresponding two adjacent sub-pixels based on the corresponding compensation signal in a display operation;

a driving chip, connected to the driving circuit, the driving chip is configured to obtain a detection driving current from the driving circuit, obtain a compensation signal based on the detection driving current, and compensate the data driving signal by the compensation signal;

wherein each of the plurality of sub-pixels comprises:

a light-emitting element;

a pre-charging unit, connected to a data line to receive a data driving signal;

a driving unit, connected to the pre-charging unit and the light-emitting element; and a detection unit, connected to the driving unit and the detection line;

a path control unit, connected between the driving unit and the light-emitting element; wherein detection units of the sub-pixels in two adjacent columns are connected to the same detection line, and two adjacent sub-pixels are configured to simultaneously perform a detection operation; in the detection operation, a pre-charging unit of any of two adjacent sub-pixels is configured to receive a corresponding data driving signal of any of two adjacent sub-pixels through a corresponding data line connected thereto, a driving unit of any of the two adjacent sub-pixels is configured to generate a corresponding detection driving current of any of the two adjacent sub-pixels based on the corresponding data driving signal, and a detection unit of any of the two adjacent sub-pixels is configured to detect a detection driving current generated by the corresponding driving unit connected thereto, such that the display panel determines the corresponding compensation signal of the corresponding two adjacent sub-pixels based on corresponding driving currents of the corresponding two adjacent sub-pixels and compensates the data driving signals of the corresponding two adjacent sub-pixels based on the corresponding compensation signal; and in the detection operation, a path control unit of any of two adjacent sub-pixels is configured not to conduct a loop where a corresponding driving unit and a corresponding light-emitting element of any of two adjacent sub-pixels are located, and a corresponding detection unit of any of two adjacent sub-pixels is configured to detect the detection driving current generated by the corresponding driving unit connected thereto, and output a sum of the detection driving currents of the corresponding two adjacent sub-pixels through the detection line, such that the display panel determines the corresponding compensation signal of the corresponding two adjacent sub-pixels; in the display operation, a path control unit of any of the plurality of sub-pixels is configured to conduct the loop where a corresponding driving unit and a corresponding light-emitting element of any of the plurality of sub-pixels are located, and the corresponding driving unit is in a high-impedance state, the corresponding driving unit is configured to generate the corresponding display driving current of any of the plurality of sub-pixels based on the corresponding compensated data driving signal, and the corresponding display driving current flows through the corresponding light-emitting element of any of the plurality of sub-pixels through a conductive path control unit of any of the plurality of sub-pixels, to drive the corresponding light-emitting element to emit light;

in the display operation, a pre-charging unit of any of the plurality of sub-pixels is configured to receive the corresponding compensated data driving signal through the data line, and a driving unit of any of the plurality of sub-pixels is configured to generate a corresponding display driving current of any of the plurality of sub-pixels based on the corresponding compensated data driving signal to drive the light-emitting element to emit light;

the pre-charging unit comprises:

a first switch, comprising a first terminal, a second terminal, and a control terminal; wherein the first terminal of the first switch is connected to the data line, the second terminal of the first switch is connected to the driving unit, and the control terminal of the first switch is configured to receive a first scanning signal;

the driving unit comprises:

a second switch, comprising a first terminal, a second terminal, and a control terminal; wherein the first terminal of the second switch is connected to a first voltage source, the second terminal of the second switch is connected to the detection unit, and the control terminal of the second switch is connected to the pre-charging unit; and a capacitor, comprising a first terminal and a second terminal; wherein the first terminal of the capacitor is connected to the first terminal of the second switch, and the second terminal of the capacitor is connected to the control terminal of the second switch;

the detection unit comprises:

a third switch, comprising a first terminal, a second terminal, and a control terminal; wherein the first terminal of the third switch is connected to the driving unit, the second terminal of the third switch is connected to the detection line, and the control terminal of the third switch is configured to receive a second scanning signal;

the path control unit comprises:

a fourth switch, comprising a first terminal, a second terminal, and a control terminal; wherein the first terminal of the fourth switch is connected to the driving unit, the second terminal of the fourth switch is connected to the light-emitting element, and the control terminal of the fourth switch is configured to receive a control signal;

wherein in a pre-charging phase of the detection operation, in each of the two adjacent sub-pixels, the first scanning signal thereof is at a high voltage, the first switch thereof is turned on, the data line thereof outputs the data driving signal, and the data driving signal is written to a first node thereof through the first switch, the first node is defined by a connection point between the driving unit thereof and the pre-charging unit thereof; at this time, the second scanning signal thereof is at a low voltage, and the third switch thereof is turned off, the fourth switch thereof receives the control signal and is in a non-conductive state after, and no current flows through a second node thereof, the second node is defined by a connection point between the driving unit thereof and the detecting unit thereof;

in a detection stage of the detection operation, in each of the two adjacent sub-pixels, the first scanning signal thereof is at a low voltage, the first switch thereof is turned off, the data driving signal of the first node thereof is stored in the capacitor thereof, and at this time, the second scanning signal thereof is at a high voltage, the third switch thereof is turned on, and the second switch thereof is in a conductive state under the control of the data driving signal, and a current flows through the second node thereof, and the current is detection driving current; the detection unit thereof is conductive based on the second scanning signal to output a sum of the detection driving currents of the two adjacent sub-pixels to the driving chip through the detection line; at this time, the fourth switch thereof receives the control signal and is still in a non-conductive state after receiving, and the light-emitting element does not emit light.

11. The display panel as claimed in claim 10, wherein a distance between driving units of the two adjacent sub-pixels is less than or equal to a width of a sub-pixel.

12. The display panel as claimed in claim 10, wherein the driving chip is configured to perform a calculation and obtain gray scales of the plurality of sub-pixels at different positions on the display panel based on detection driving currents in a group of two adjacent sub-pixels in combination with an algorithm to obtain the corresponding compensation signal of corresponding two adjacent sub-pixels for any of the gray scales; and to compensate the data driving signals of the two adjacent sub-pixels by the corresponding compensation signal, such that when the display panel performs the display operation, the currents flowing through the light-emitting elements are the same when the gray scales at different positions are the same.

13. A driving method for a driving circuit of a display panel, comprising:

two adjacent sub-pixels simultaneously performing a detection operation, and respectively obtaining detection driving currents of the two adjacent sub-pixels in one-to-one correspondence in the detection operation;

determining a common compensation signal of the two adjacent sub-pixels based on the detection driving currents of the two adjacent sub-pixels; and compensating data driving signals of the two adjacent sub-pixels by the common compensation signal, and driving light-emitting element of each of the two adjacent sub-pixels to emit light, in a display operation;

wherein the two adjacent sub-pixels simultaneously performing a detection operation, comprising:

in the detection operation, a pre-charging unit of any of two adjacent sub-pixels receiving a corresponding data driving signal of any of two adjacent sub-pixels through a corresponding data line connected thereto;

a driving unit of any of the two adjacent sub-pixels generating a corresponding detection driving current of any of the two adjacent sub-pixels based on the corresponding data driving signal; and a detection unit of any of the two adjacent sub-pixels detecting a detection driving current generated by the corresponding driving unit connected thereto, such that the display panel determines the corresponding compensation signal of the corresponding two adjacent sub-pixels based on corresponding driving currents of the corresponding two adjacent sub-pixels and compensates the data driving signals of the corresponding two adjacent sub-pixels based on the corresponding compensation signal;

wherein in a pre-charging phase of the detection operation, in each of the two adjacent sub-pixels, a control terminal of a first switch of the pre-charging unit receives a first scanning signal, the first scanning signal thereof is at a high voltage, the first switch thereof is turned on, the data line thereof outputs the data driving signal, and the data driving signal is written to a first node thereof through the first switch, the first node is defined by a connection point between the driving unit thereof and the pre-charging unit thereof; at this time, a control terminal of a third switch of the detection unit receives a second scanning signal, the second scanning signal thereof is at a low voltage, and a third switch of the detection unit is turned off, a fourth switch of the path control unit receives the control signal and is in a non-conductive state after, and no current flows through a second node thereof, the second node is defined by a connection point between the driving unit thereof and the detecting unit thereof;

in a detection stage of the detection operation, in each of the two adjacent sub-pixels, the control terminal of the first switch of the pre-charging unit receives the first scanning signal, the first scanning signal thereof is at a low voltage, the first switch thereof is turned off, the data driving signal of the first node thereof is stored in the capacitor thereof, and at this time, the control terminal of the third switch of the detection unit receives the second scanning signal, the second scanning signal thereof is at a high voltage, the third switch thereof is turned on, and the second switch thereof is in a conductive state under the control of the data driving signal, and a current flows through the second node thereof, and the current is detection driving current; the detection unit thereof is conductive based on the second scanning signal to output a sum of the detection driving currents of the two adjacent sub-pixels to the driving chip through the detection line; at this time, a fourth switch of the path control unit receives the control signal and is still in a non-conductive state after receiving, and the light-emitting element does not emit light;

wherein the determining a common compensation signal of the two adjacent sub-pixels based on the detection driving currents of the two adjacent sub-pixels, comprising:

a path control unit of any of two adjacent sub-pixels not conducting a loop where a corresponding driving unit and a corresponding light-emitting element of any of two adjacent sub-pixels are located;

a corresponding detection unit of any of two adjacent sub-pixels detecting the detection driving current generated by the corresponding driving unit connected thereto, and outputting a sum of the detection driving currents of the corresponding two adjacent sub-pixels through the detection line, such that the display panel determines the corresponding compensation signal of the corresponding two adjacent sub-pixels;

wherein the compensating data driving signals of the two adjacent sub-pixels by the common compensation signal, comprising:

in the display operation, a path control unit of any of the plurality of sub-pixels conducting the loop where a corresponding driving unit and a corresponding light-emitting element of any of the plurality of sub-pixels are located, and the corresponding driving unit being in a high-impedance state, the corresponding driving unit generating the corresponding display driving current of any of the plurality of sub-pixels based on the corresponding compensated data driving signal, and the corresponding display driving current flowing through the corresponding light-emitting element of any of the plurality of sub-pixels through a conductive path control unit of any of the plurality of sub-pixels, to drive the corresponding light-emitting element to emit light;

the pre-charging unit of any of the plurality of sub-pixels receiving the corresponding compensated data driving signal through the data line, and a driving unit of any of the plurality of sub-pixels generating a corresponding display driving current of any of the plurality of sub-pixels based on the corresponding compensated data driving signal to drive the light-emitting element to emit light.

* * * * *